(12) United States Patent
Jia et al.

(10) Patent No.: US 8,692,429 B2
(45) Date of Patent: Apr. 8, 2014

(54) MOTOR CASING HAVING A PLURALITY OF BRACKETS DISPOSED ON THE MIDDLE PORTION OF THE WALL OF THE MOTOR CASING

(75) Inventors: Hongyu Jia, Zhongshan (CN); Xiongcheng Wang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 66 days.

(21) Appl. No.: 13/301,772

(22) Filed: Nov. 21, 2011

(65) Prior Publication Data

US 2012/0139373 A1 Jun. 7, 2012

(30) Foreign Application Priority Data

Dec. 4, 2010 (CN) .................. 2010 2 0652223 U

(51) Int. Cl.
*H02K 5/00* (2006.01)
(52) U.S. Cl.
USPC ............... 310/89; 310/91; 310/413; 310/415; 310/418

(58) Field of Classification Search
USPC .............. 310/89, 91, 413, 415, 418; 248/674, 248/675, 603, 605, 666; 417/353
See application file for complete search history.

(56) References Cited

U.S. PATENT DOCUMENTS

| 3,268,257 | A | * | 8/1966 | Delaney | 297/423.17 |
| 4,597,555 | A | * | 7/1986 | Weihsmann | 248/672 |
| 2006/0125330 | A1 | * | 6/2006 | Winkler et al. | 310/51 |
| 2007/0024135 | A1 | * | 2/2007 | Simofi-Ilyes et al. | 310/89 |

* cited by examiner

*Primary Examiner* — Tran Nguyen
*Assistant Examiner* — Jose Gonzalez Quinones
(74) *Attorney, Agent, or Firm* — Matthias Scholl P.C.; Matthias Scholl

(57) ABSTRACT

A motor casing, including a hollow motor casing body. The wall of the motor casing body comprises a plurality of brackets and a plurality of grooves which are formed simultaneously by punching the wall of the motor casing body. The plurality of grooves is disposed one close to one of the brackets. One end of each bracket is coupled to the wall of the motor casing body. The motor casing has a simple structure, low cost, and reliable connection and requires less materials compared to conventional motor casings.

7 Claims, 4 Drawing Sheets

MOTOR CASING HAVING A PLURALITY OF BRACKETS DISPOSED ON THE MIDDLE PORTION OF THE WALL OF THE MOTOR CASING

CROSS-REFERENCE TO RELATED APPLICATIONS

Pursuant to 35 U.S.C. §119 and the Paris Convention Treaty, this application claims the benefit of Chinese Patent Application No. 201020652223.3 filed Dec. 4, 2010, the contents of which are incorporated herein by reference.

BACKGROUND OF THE INVENTION

1. Field of the Invention

The invention relates to a motor casing.

2. Description of the Related Art

Conventionally, a motor casing is only used for mounting a rotor assembly and a stator assembly. An external mounting bracket, separating from the motor casing, is often required to connect the motor with external devices. The external mounting bracket is generally coupled with the motor casing by means of welding or riveting and another method is to arrange a number of threaded holes on the motor casing to fix them with bolts and nuts, however, such method has the following disadvantages: the working procedure is complicated, more materials are required, production costs are high, and the mounting brackets are easily to come off.

SUMMARY OF THE INVENTION

In view of the above-described problems, it is one objective of the invention to provide a motor casing that has a simple structure, low cost, and reliable connection and requires fewer material.

To achieve the above objective, in accordance with one embodiment of the invention, there provided is a motor casing, comprising a hollow motor casing body having a wall, a plurality of brackets disposing on the wall, and a plurality of grooves disposed in the wall, wherein each of the plurality of grooves is formed one with one of the plurality of brackets by punching the wall; each of the plurality of grooves is disposed one beside one of the plurality of brackets; and one end of each bracket is coupled to the wall of the motor casing body.

In a class of this embodiment, the brackets each comprises a fixed part, a middle connecting part, and a mounting part, in which one end of the fixed part is coupled to the motor casing body and the other end is coupled to the middle connecting part, and one outer end of the middle connecting part is coupled to the mounting part.

In a class of this embodiment, the fixed part and the mounting part are mutually perpendicular to each other and the middle connecting part is in a twisted shape.

In a class of this embodiment, the brackets are located in the same section of the wall of the motor casing body and spaced apart along the circumferential direction.

In a class of this embodiment, the number of the brackets is three and two adjacent brackets form an angle of 120°.

In a class of this embodiment, the mounting part is arranged with two mounting holes.

In a class of this embodiment, the motor casing body is in a cylindrical shape.

Advantages of the invention are summarized below:

1) the wall of the motor casing body comprises a plurality of brackets and a plurality of grooves, wherein the plurality of brackets and the plurality of grooves are simultaneously formed by punching the wall of the motor casing body so that each of the plurality of grooves is disposed one close to one of the plurality of brackets; the brackets are disposed on the wall and one end of each bracket is coupled to the wall; and the grooves are disposed inside the wall. The brackets are made to the required size by using parts of the motor casing, therefore more materials are saved, costs are reduced, connection becomes more reliable, and market competitiveness are enhanced for the motors;
2) the brackets each comprises a fixed part, a middle connecting part, and a mounting part, in which one end of the fixed part is coupled to the motor casing body and the other end is coupled to the middle connecting part, and one outer end of the middle connecting part is coupled to the mounting part. The fixed part and the mounting part are mutually perpendicular to each other and the middle connecting part is in a twisted shape. Such structure is more tight and secure and the potential safety hazard due to second time connection has been reduced; and
3) the brackets are in the same section of the wall of the motor casing body and spaced apart along the circumferential direction. The number of the brackets is three and two adjacent brackets form an angle of 120°. The stress of such structure is even and the motor can be stably fixed on the external devices.

DETAILED DESCRIPTION OF THE EMBODIMENTS

For further illustrating the invention, experiments detailing a motor casing are described below. It should be noted that the following examples are intended to describe and not to limit the invention.

Figure 1:
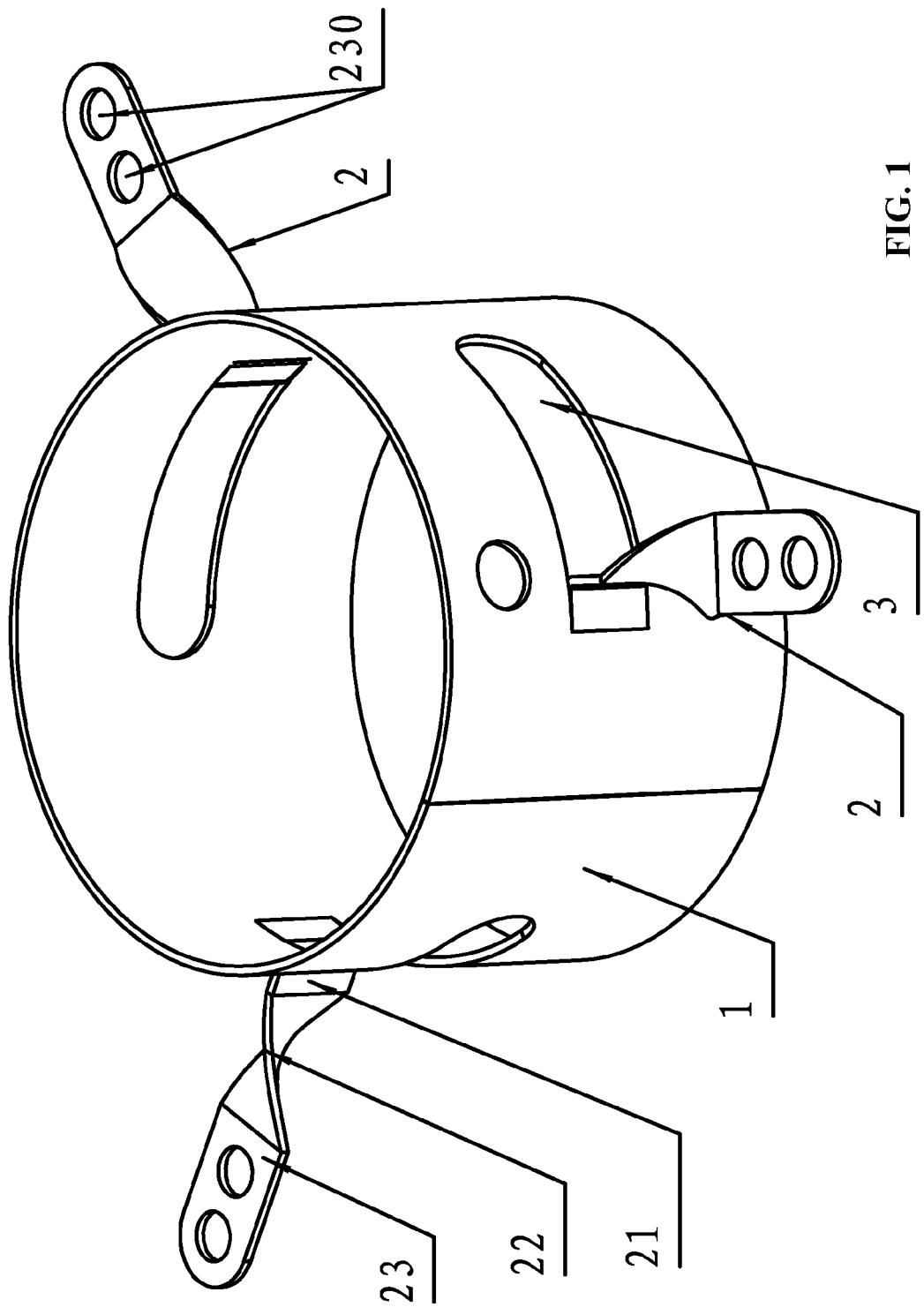
FIG. 1 is a three-dimensional diagram of a motor casing of one embodiment of the invention.
Figure 2:
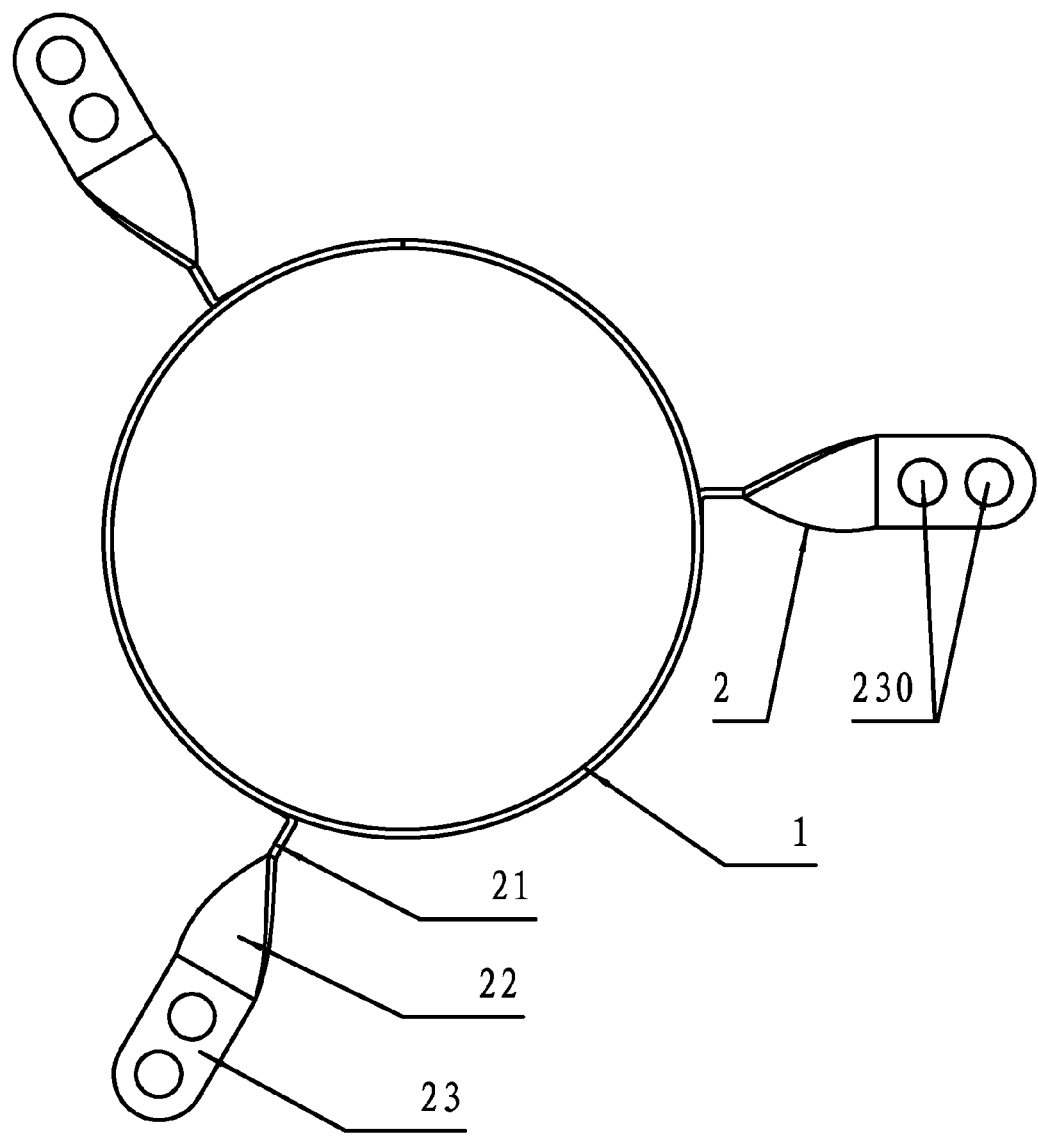
FIG. 2 is a front view of a motor casing of one embodiment of the invention.
Figure 3:
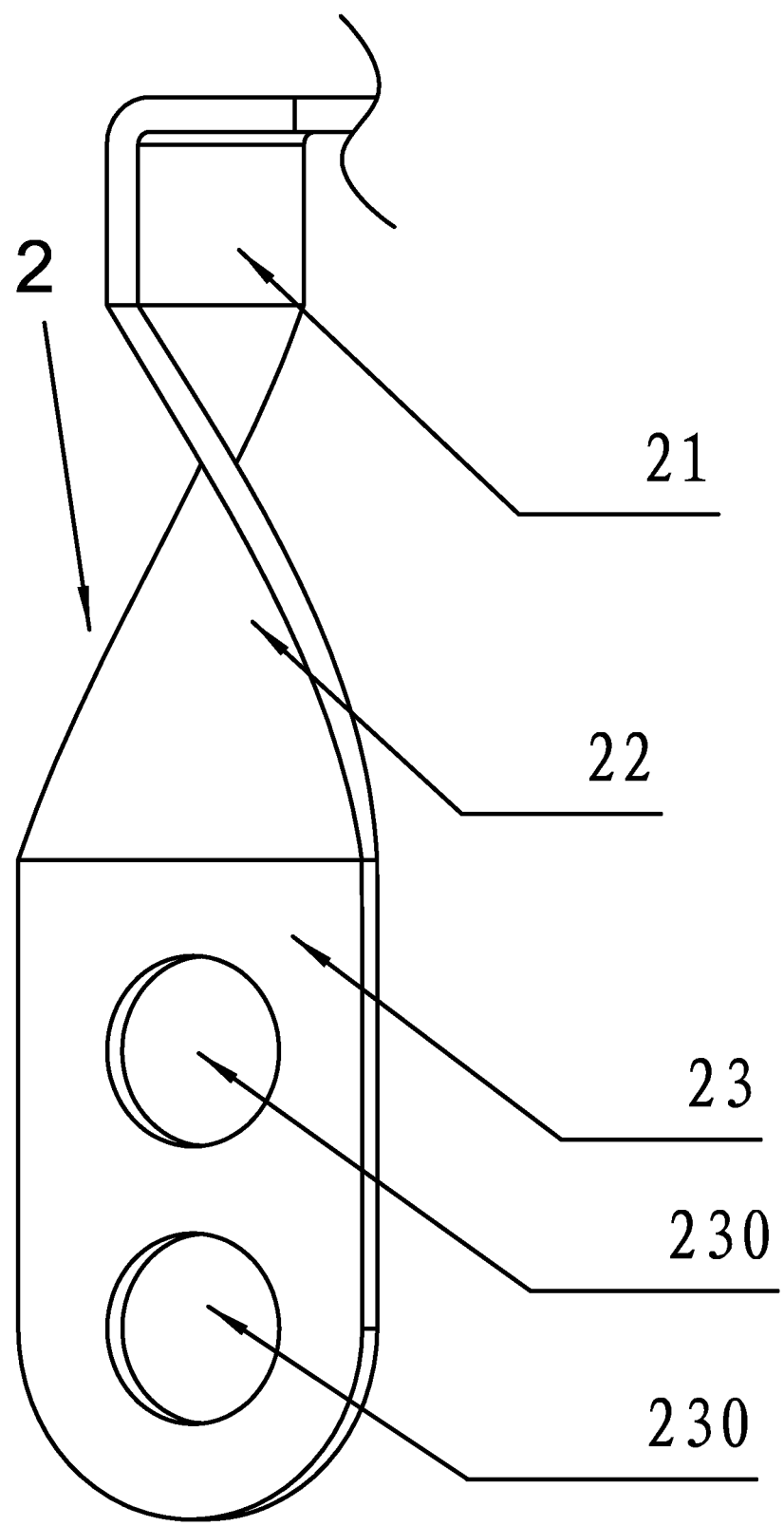
FIG. 3 is a three-dimensional diagram of a bracket of a motor casing of one embodiment of the invention.
Figure 4:
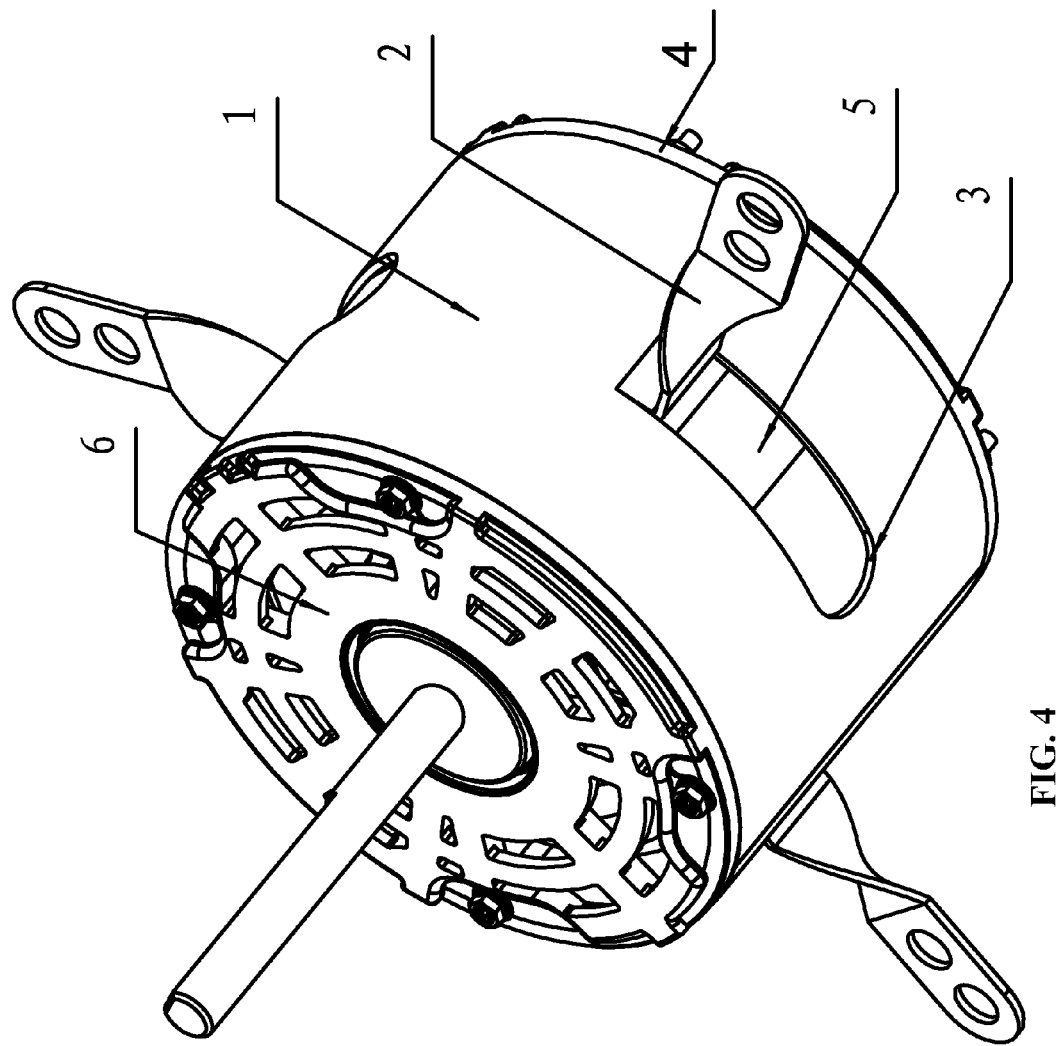
FIG. 4 is a structure diagram of mounting between the motor casing of the invention and other parts of the motor.

As shown in FIGS. 1-3, a motor casing of the invention comprises a hollow motor casing body 1, and the wall thereof is stamped to simultaneously produce a plurality of brackets 2 and a plurality of grooves 3. Thus, each groove 3 is formed close to one of the brackets 2 on the wall of the motor casing body 1. One end of each bracket 2 is coupled to the wall of the motor casing body 1; the brackets 2 each comprises a fixed part 21, a middle connecting part 22, and a mounting part 23. One end of the fixed part 21 is coupled to the motor casing body 1 and the other end is coupled to the middle connecting part 22, and an outer end of the middle connecting part 22 is coupled to the mounting part 23. The fixed part 21 and the mounting part 23 are mutually perpendicular to each other and the middle connecting part 22 is in a twisted shape. The brackets 2 are in the same section of the wall of the motor casing body 1 and spaced apart along the circumferential direction. The number of the brackets 2 is three and two adjacent brackets 2 form an angle of 120°. The mounting part 23 is arranged with two mounting holes 230. The motor casing body 1 is in a cylindrical shape.

As shown in FIGS. 1-4, the motor casing of the invention and other parts of the motor are assembled as follows: a rotor assembly and a stator assembly 5 are mounted inside the motor casing body 1, and the wall thereof is punched to produce a plurality of brackets 2 and a plurality of grooves 3. Thus, the plurality of brackets 2 and the plurality of grooves 3 are formed simultaneously on the wall of the motor casing body 1. An upper end cover 6 connects with the top of the motor casing body 1. A lower end cover 4 is coupled to the bottom of the motor casing body 1 to form a physical motor body. The brackets 2 stamped on the wall of the motor casing body 1 are connected with external devices.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor casing comprising a hollow body, said hollow body comprising:
    a wall;
    a plurality of brackets; and
    a plurality of grooves;
    wherein:
    said plurality of brackets is disposed on the wall and one end of each of said plurality of brackets is coupled to the wall;
    said plurality of grooves is disposed in the wall;
    said plurality of brackets is formed in a middle portion of the wall by punching the wall in a circumferential direction whereby said plurality of grooves is formed adjacent to said plurality of brackets;
    each of said plurality of brackets comprises a fixed part having a first inner end and a first outer end, a middle connecting part having a second inner end and a second outer end, and a mounting part having a third inner end and a third outer end;
    said first inner end is connected to the wall and said first outer end is connected to said second inner end;
    said second outer end is connected to said third inner end; and
    said fixed part is oriented in a vertical plane, said mounting part is oriented in a horizontal plane, and said middle connecting part has a twisted shape.

2. The motor casing of claim 1, wherein said plurality of brackets is located in the same section of the wall of the motor casing body and spaced apart along the circumferential direction.

3. The motor casing of claim 1, wherein the number of said plurality of brackets is three and two adjacent brackets form an angle of 120°.

4. The motor casing of claim 1, wherein the mounting part is arranged with two mounting holes.

5. The motor casing of claim 1, wherein the motor casing body is in a cylindrical shape.

6. In a motor casing for a motor, the motor casing comprising a body, the improvement comprising: a plurality of brackets being formed in a middle portion of a wall of said body by punching the wall a circumferential direction whereby a plurality of grooves is formed adjacent to said plurality of brackets: wherein:
    each of said plurality of brackets comprises a fixed part having a first inner end and a first outer end, a middle connecting part having a second inner end and a second outer end, and a mounting part having a third inner end and a third outer end;
    said first inner end is connected to the wall and said first outer end is connected to said second inner end;
    said second outer end is connected to said third inner end; and
    said fixed part is oriented in a vertical plane, said mounting part is oriented in a horizontal plane, and said middle connecting part has a twisted shape.

7. The motor casing of claim 1, wherein when in use in a motor, a placement of said plurality of brackets in said middle portion of the wall increases a stability of the motor.

* * * * *